US007851766B2

(12) United States Patent
Frank

(10) Patent No.: US 7,851,766 B2
(45) Date of Patent: Dec. 14, 2010

(54) MULTI-STAGE SYSTEM FOR VERIFICATION OF CONTAINER CONTENTS

(75) Inventor: David L. Frank, Highland Beach, FL (US)

(73) Assignee: Innovative American Technology Inc., Coconut Creek, FL (US)

( * ) Notice: Subject to any disclaimer, the term of this patent is extended or adjusted under 35 U.S.C. 154(b) by 502 days.

(21) Appl. No.: 11/564,193

(22) Filed: Nov. 28, 2006

(65) Prior Publication Data

US 2009/0101826 A1    Apr. 23, 2009

Related U.S. Application Data

(63) Continuation-in-part of application No. 11/291,574, filed on Dec. 1, 2005, which is a continuation-in-part of application No. 10/280,255, filed on Oct. 25, 2002, now Pat. No. 7,005,982.

(60) Provisional application No. 60/759,332, filed on Jan. 17, 2006, provisional application No. 60/759,331, filed on Jan. 17, 2006, provisional application No. 60/759,373, filed on Jan. 17, 2006, provisional application No. 60/759,375, filed on Jan. 17, 2006, provisional application No. 60/347,997, filed on Oct. 26, 2001.

(51) Int. Cl.
*G01F 23/00* (2006.01)

(52) U.S. Cl. ............... 250/390.01; 250/360.1; 250/359.1; 250/358.1; 378/57; 378/63

(58) Field of Classification Search ............... 250/360.1, 250/390.01, 359.1, 358.1; 378/57, 63
See application file for complete search history.

(56) References Cited

U.S. PATENT DOCUMENTS 4,158,773 A    6/1979   Novak (Continued)

FOREIGN PATENT DOCUMENTS

KR    10-1992-7004134    12/1992

(Continued)

OTHER PUBLICATIONS

U.S. Appl. No. 11/291,574, filed Dec. 2005, Frank.
U.S. Appl. No. 11/363,594, filed Feb. 2006, Frank.

(Continued)

*Primary Examiner*—David P Porta
*Assistant Examiner*—Djura Malevic
(74) *Attorney, Agent, or Firm*—Jose Gutman; Fleit Gibbons Gutman Bongini & Bianco PL

(57) ABSTRACT

A multi-stage process utilizing one or more radiation sensors on a distributed network for the detection and identification of radiation, explosives, and special materials within a shipping container. The sensors are configured as nodes on the network. The system supports extended time options at each node and the ability to combine data from multiple nodes for the data acquisition and analysis of shipping containers. The system collects radiation data from one or more nodes and compares the collected data to one or more stored spectral images representing one or more isotopes to identify one or more isotopes present. The identified one or more isotopes present are corresponded to possible materials or goods that they represent. The possible materials or goods are compared with the manifest relating to the container to confirm the identity of materials or goods contained in the container or to detect and/or identify unauthorized materials or goods in the container. The containers are monitored and tracked as they are moved between the nodes. A central monitoring station monitors the radiological sensors, the information from the nodes and the tracking of the shipping containers. For shielded materials, explosives and other types of material detection, a neutron pulse device could be incorporated into the spreader bar position, the secondary position or both.

15 Claims, 9 Drawing Sheets

U.S. PATENT DOCUMENTS

| | | | |
|---|---|---|---|
| 4,799,828 | A | 1/1989 | Georgii |
| 5,056,958 | A | 10/1991 | Campbell |
| 5,241,573 | A | 8/1993 | Thacker |
| 5,633,508 | A | 5/1997 | Schleppenbach |
| 5,665,970 | A | 9/1997 | Kronenberg et al. |
| 5,838,759 | A * | 11/1998 | Armistead ................... 378/57 |
| 6,370,222 | B1 * | 4/2002 | Cornick, Jr. .................. 378/57 |
| 6,433,335 | B1 | 8/2002 | Kronenberg et al. |
| 6,479,826 | B1 | 11/2002 | Klann et al. |
| 6,545,281 | B1 | 4/2003 | McGregor et al. |
| 6,845,873 | B1 * | 1/2005 | Chattey ..................... 212/270 |
| 6,891,470 | B2 | 5/2005 | Bohinc |
| 6,937,692 | B2 | 8/2005 | Johnson |
| 6,980,483 | B2 | 12/2005 | McDonald |
| 6,998,617 | B2 * | 2/2006 | D'Emilio et al. ......... 250/358.1 |
| 7,026,944 | B2 | 4/2006 | Alioto et al. |
| 7,030,755 | B2 | 4/2006 | Bohinc |
| 7,064,336 | B2 | 6/2006 | Archer et al. |
| 7,116,235 | B2 * | 10/2006 | Alioto et al. ................ 340/600 |
| 7,151,447 | B1 * | 12/2006 | Willms et al. ............... 340/540 |
| 7,183,554 | B2 | 2/2007 | Gallagher et al. |
| 7,356,115 | B2 | 4/2008 | Ford et al. |
| 2002/0175291 | A1 | 11/2002 | Reeder et al. |
| 2003/0108150 | A1 * | 6/2003 | Franke ........................ 378/57 |
| 2003/0144800 | A1 | 7/2003 | Davis et al. |
| 2003/0165211 | A1 | 9/2003 | Grodzins et al. |
| 2003/0201394 | A1 * | 10/2003 | Peoples ................... 250/336.1 |
| 2004/0018060 | A1 | 1/2004 | Knezek et al. |
| 2004/0119591 | A1 | 6/2004 | Peeters |
| 2004/0126895 | A1 | 7/2004 | Overbeck et al. |
| 2004/0148137 | A1 | 7/2004 | Zerwekh et al. |
| 2005/0011849 | A1 | 1/2005 | Chattey |
| 2005/0023477 | A1 * | 2/2005 | Archer et al. .......... 250/370.11 |
| 2005/0082485 | A1 | 4/2005 | Torii |
| 2005/0156734 | A1 | 7/2005 | Zerwekh et al. |
| 2005/0205793 | A1 | 9/2005 | Bohinc |
| 2005/0220247 | A1 | 10/2005 | Ruddy et al. |
| 2005/0258372 | A1 | 11/2005 | McGregor et al. |
| 2005/0275545 | A1 * | 12/2005 | Alioto et al. ................ 340/600 |
| 2006/0097171 | A1 | 5/2006 | Balchunas et al. |
| 2006/0138331 | A1 * | 6/2006 | Guillebaud et al. ...... 250/359.1 |
| 2006/0284094 | A1 | 12/2006 | Inbar |
| 2007/0001123 | A1 | 1/2007 | Andrews et al. |

FOREIGN PATENT DOCUMENTS

| | | |
|---|---|---|
| KR | 10-1005-0067392 | 7/2005 |
| WO | WO98-00681 | 1/1998 |
| WO | WO2006-085999 | 8/2006 |

OTHER PUBLICATIONS

U.S. Appl. No. 11/564,193, filed Nov. 2006, Frank.
U.S. Appl. No. 11/931,370, filed Oct. 2007, Frank.
International Preliminary Report on Patentabiilty for PCT/US06/46255 mailed Sep. 24, 2008.
International Search Report and Written Opinion of the International Searching Authority for PCT/US06/46255 mailed Sep. 25, 2007.
Written Opinion of the International Searching Authority for PCT/US07/085578 dated Jan. 23, 2009.
International Search Report for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. Appl. No. 11/291,574 dated Dec. 2, 2008.
Final Rejection for U.S. Appl. No. 11/291,574 dated Mar. 20, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.
Notice of Allowance for 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 18, 2010.

* cited by examiner

Approximate Location of Main Unit on STS-45

MAIN CONFIGURATION

BOTTOM ISO-VIEW        TOP ISO-VIEW

MAIN CONFIGURATION

BOTTOM ISO-VIEW        TOP ISO-VIEW $B_i(X) = A_i(X) * \text{alpha} + B_{i-1}(X) * (1-\text{alpha})$

| $B_i(X) =$ | $A_i(X)$ | $* \text{alpha}$ | $+ B_{i-1}(X)$ | $* (1-\text{alpha})$ |
|---|---|---|---|---|
| New Dynamic Background | Snap Shot of Background | Learning Rate | Previous Background | Differential |

B = Calculated Background
A = Incremental Background
X = Channel Number

FIG. 9

MULTI-STAGE SYSTEM FOR VERIFICATION OF CONTAINER CONTENTS

CROSS-REFERENCE TO RELATED APPLICATIONS

This application is based on, and claims priority from, prior co-pending U.S. Provisional Patent Application No. 60/759,332, filed on Jan. 17, 2006, by inventor David L. FRANK, and entitled "Sensor Interface Unit And Method For Automated Support Functions For CBRNE Sensors"; and further is based on, and claims priority from, prior co-pending U.S. Provisional Patent Application No. 60/759,331, filed on Jan. 17, 2006, by inventor David L. FRANK, and entitled "Method For Determination Of Constituents Present From Radiation Spectra And, If Available, Neutron And Alpha Occurrences"; and further is based on, and claims priority from, prior co-pending U.S. Provisional Patent Application No. 60/759,373, filed on Jan. 17, 2006, by inventor David L. FRANK, and entitled "Distributed Sensor Network with Common Platform for CBRNE Devices; and further is based on, and claims priority from, prior co-pending U.S. Provisional Patent Application No. 60/759,375, filed on Jan. 17, 2006, by inventor David L. FRANK, and entitled Advanced Container Verification System; and furthermore is a continuation-in-part of, and claims priority from, prior co-pending U.S. patent application Ser. No. 11/291,574, filed on Dec. 1, 2005, which is a continuation-in-part of, and claims priority from, prior U.S. patent application Ser. No. 10/280,255, filed on Oct. 25, 2002 now U.S. Pat. No. 7,005,982, that was based on prior U.S. Provisional Patent Application No. 60/347,997, filed on Oct. 26, 2001, now expired, and which further is based on, and claims priority from, prior co-pending U.S. Provisional Patent Application No. 60/631,865, filed on Dec. 1, 2004, now expired, and which furthermore is based on, and claims priority from, prior co-pending U.S. Provisional Patent Application No. 60/655,245, filed on Feb. 23, 2005, now expired, and which furthermore is based on, and claims priority from, prior co-pending U.S. Provisional Patent Application No. 60/849,350, filed on Oct. 4, 2006, and which furthermore is based on, and claims priority from, prior co-pending U.S. patent application Ser. No. 11/363,594 filed on Feb. 27, 2006; the collective entire disclosure of which being herein incorporated by reference.

BACKGROUND OF THE INVENTION

1. Field of the Invention

This invention relates in general to shipping container contents detection systems, and more particularly to a noninvasive system and method to detect and identify hazardous materials within containers, such as radiation and/or neutron emitting materials, explosives, and special materials such as highly enriched uranium, and further to identify the normally occurring radiological materials within containers.

2. Description of Related Art

Current attempts at providing radiation, neutron, explosives, and special materials, detection systems to verify shipping containers, such as those that have been mounted on the gantry crane arms, have a limited time to identify the isotopes present. Radiation sensor systems for detecting and identifying radiological materials held within shipping containers may not have the exposure time required to specifically identify all of the isotope types that may be present. The limited time to detect and identify the isotopes present may affect the ability to evaluate the validity of the contents. The limited time for interval provided by current shipping container detection systems, such as for use with gantry cranes, detrimentally affect the commercial viability of radiation, neutron, explosives, and special materials, detection systems and cause the containers to be manually interrogated which results in negative impacts to the flow of commerce.

Therefore a need exists to overcome the problems with the prior art as discussed above.

SUMMARY OF THE INVENTION

According to an embodiment of the present invention, a multi-stage detection system and method detects gamma and neutron radiation providing additional data capture times when radiological materials are detected and a secondary position for further analysis. The gamma and neutron detectors mounted on the spreader bar of a gantry crane provide an initial identification of the presence of radiological materials within a shipping container. The spreader bar typically provides up to 30 seconds of close proximity for the radiation sensors to analyze the shipping container. The radiation data captured is analyzed for specific isotope identification. Should the system require more data to complete the analysis, the spreader bar contact with the shipping container is extended to enable additional data capture. Furthermore, if the shipping container requires further analysis time to determine the specific isotopes present, an embodiment of the present invention provides a secondary radiation analysis position comprised of an array of radiation sensors deployed to allow the targeted container to be further analyzed. The present invention, according to an embodiment, allows an extended time for radiation analysis for those shipping containers where radiological materials have been detected and where the normal flow of the gantry crane movement does not allow for a complete analysis. Additionally, an embodiment of the present invention provides for a secondary radiation analysis position where the additional time for analysis is required beyond that provided at the gantry crane. Another embodiment provides for tracking and monitoring of the targeted shipping container as it moves from the spreader bar to the secondary radiation analysis position.

In order to verify whether radioactive materials are concealed within a shipping container, isotope sensing and identification systems can be deployed in association with a container, such as with a crane assembly used to lift shipping and transfer containers. Typically, the container crane includes a hoist-attachment which engages the shipping container. An isotope sensing and identification system would consist of one or more gamma and neutron detectors that are mounted on the crane hoist-attachment (or on the spreader arm) and provide detailed radiation spectral data to a computer system performing spectral analysis for the detection and identification of isotope(s) that are present in the containers. Many normally occurring radiological materials exist in common goods and cause radiation detection systems to produce false alarms.

The first stage of this process is the detection of the presence of radiological materials within the container. The second stage is to identify the specific isotopes that are present. This second stage may be completed within the 30 second period that is typical for the spreader bar of a gantry crane to be attached to the shipping container as it is moved to and from the vessel. For those instances where additional time is required to collect radiological data for the identification of the isotopes present, the time that the spreader bar is connected to the shipping container may be extended. This could be accomplished in a variety of ways. For example, the spreader bar movement could be slowed or the spreader bar could remain connected to the container for an extended period of time after being placed into position.

By identifying the specific isotope(s) that are present allows the system to also identify the types of goods or materials that the isotopes represent. With a list of potential goods that represent the identified isotopes, the system can perform a comparison between the identified goods or materials and the shipping container manifest to determine if the radiological material(s) present match the expected materials within the container. The process of 1) identifying the isotope(s) that are within a container, 2) identifying the goods or materials that the isotopes represent and 3) verifying the contents of the manifest against the identified goods, allows the efficient verification of the container without negative impact to the flow of commerce According to another embodiment, a neutron pulse device is positioned on the spreader bar to provide active analysis to determine if shielded materials such as highly enriched uranium, explosives, or other materials are present.

According to another embodiment, the radiation sensor system has a secondary position deployed for further analysis of a shipping container where radiological materials have been detected and further analysis is required to determine the specific isotopes that are present. This secondary position along with the spreader bar radiation sensor position are all part of an integrated radiological analysis system. Each radiological analysis system is configured as a node on a multi-node system. The data acquired from the spreader bar sensors is used in conjunction with the data acquired at the secondary position for analysis of the shipping container contents. The shipping container is monitored as it is moved from the spreader bar position to the secondary position. The shipping container may be monitored through the use of CCTV cameras or wireless tracking devices such as radio frequency identification devices.

According to another embodiment, the radiation sensor positions are monitored by a central monitoring station. This central monitoring station may include an interactive graphic display illustrating the map of the port, the placement of the gantry cranes, the placement of the secondary position(s), video cameras and the position of the targeted shipping container as it moves across the port to the secondary position.

According to another embodiment, the radiation sensors for each node on the system are connected to a processor system that collects and analyzes the gamma energy levels and spectral data detected and then sends this data to a spectral analysis engine. Data from each node is individually addressed and sent to the spectral analysis engine to allow for analysis of individual detector data or detector group data. The analysis engine can combine data from multiple nodes for use in analyzing the shipping container contents.

The processor system and a data collection system are electrically coupled with the sensors of each node to collect signals from the array of neutron sensor devices to form histograms with the collected spectral data. The histograms are used by the spectral analysis system to identify the isotopes that are present.

The spectral analysis system, according to an embodiment, includes an information processing system and software that analyzes the data collected and identifies the isotopes that are present. The spectral analysis software consists of more that one method to provide multi-confirmation of the isotopes identified. Should more than one isotope be present, the system identifies the ratio of each isotope present. Examples of methods that can be used for spectral analysis such as in the spectral analysis software according to an embodiment of a container verification system, include: 1) a Margin Setting method as described in U.S. Pat. No. 6,847,731; and 2) a LINSCAN method (a linear analysis of spectra method) as described in U.S. Provisional Patent Application No. 60/759, 331, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

A user interface of the information processing system, according to an embodiment, provides a graphic view of the radiation spectra detected and the isotopes identified. The user interface allows a user of the system to view, among other things, the individual detectors, detector groups, individual sensors, and sensor groups, individual nodes and a combination of multiple nodes to quickly identify maintenance conditions, radiation detected, and isotopes identified.

BRIEF DESCRIPTION OF THE DRAWINGS

FIG. 9 is a formula useful for dynamic background radiation effects compensation.

DETAILED DESCRIPTION

Figure 1:
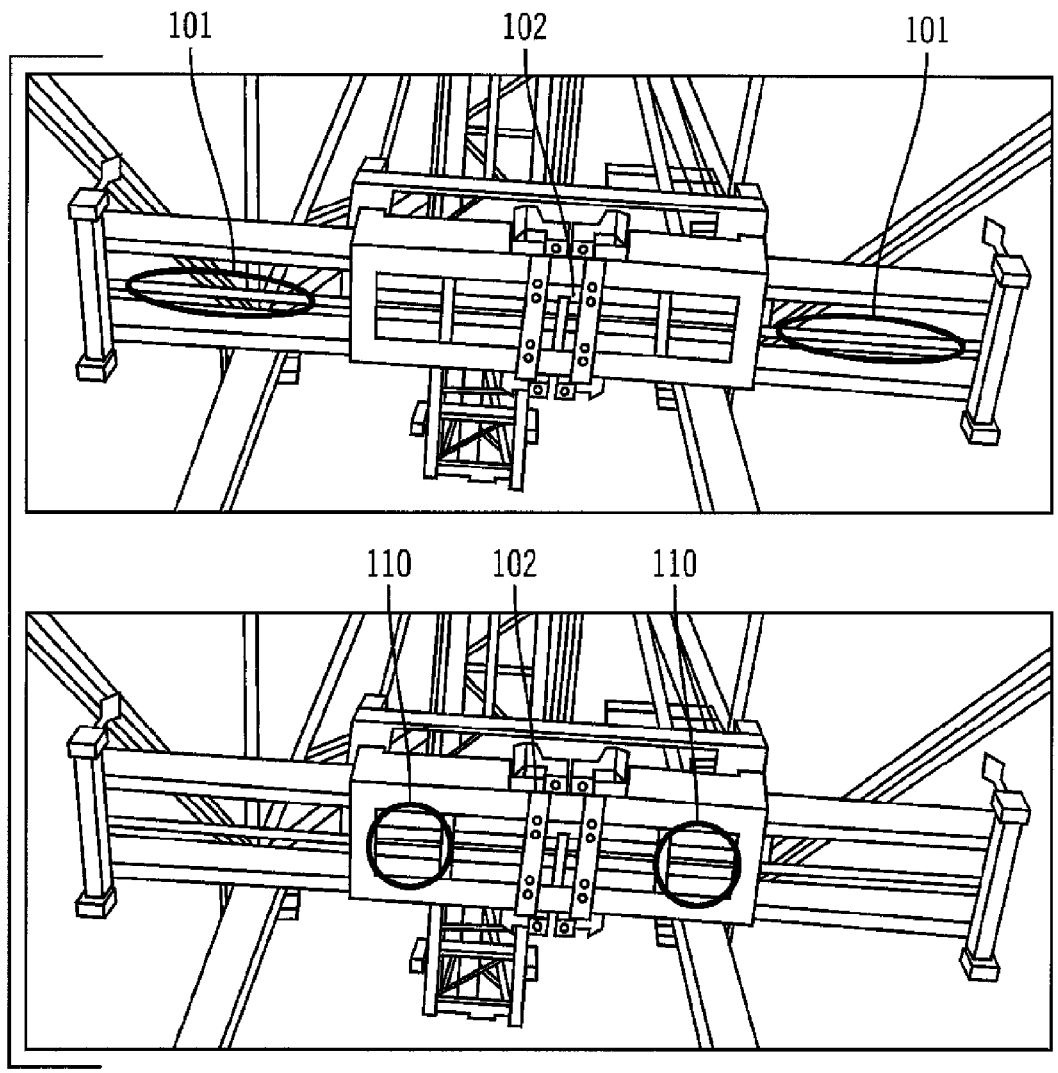
FIG. 1 is a picture depicting a container in proximity to a crane arm assembly (or a spreader bar) with sensors in sensor housings, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "/program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such as RAM, buffers, cache memory, and network circuits are contemplated to serve as such data storage means according to different embodiments of the present invention.

The present invention, according to an embodiment, overcomes problems with the prior art by providing a multi-stage radiation verification process for the contents of a shipping container. The radiation sensor data collected at each stage of the verification process is used to enable detection and identification of the specific isotopes that are present in a container under examination.

A noninvasive container contents detection and verification system, according to an embodiment of the present invention, operates without having to enter the cavity of a container under examination. The system can include multiple radiation sensor systems that use integrated digital sensors for Gamma and neutron detection, and with a spectral analysis capability to identify the specific isotope(s) of materials in containers. The multi-stage system provides for monitoring and tracking of targeted containers that are delivered to a secondary verification station. The multi-stage system provides for network connections between the spreader bar position and the secondary verification position to enable information integration. Such a multi-stage system can also include detection and identification of explosives and special materials in containers. These special materials may include highly enriched uranium.

An embodiment of the invention includes radiation sensors deployed on the spreader bar of a gantry crane to provide radiation detection and isotope identification for the contents of the shipping container. The spreader bar is connected to the shipping container for approximately 30 seconds as the container is moved to or from the vessel at a port. The multi-stage radiation verification system enables radiation detection and analysis of the contents within the shipping container within the normal 30 seconds while the spreader bar is connected to the shipping container. The multi-stage system also allows for an extended time-period for the spreader bar to stay connected to the shipping container when radiological materials have been detected that the initial 30 second analysis does not allow adequate time for the identification of the isotopes present. In addition, the multi-stage radiation verification system uses a secondary sensor position for continued analysis of the shipping container if additional time is needed beyond the extended time provided at the spreader bar. The shipping container may be tracked as it moves from the spreader bar position to the secondary position. An example of tracking and monitoring devices include CCTV cameras and wireless tracking technologies such as radio frequency identification devices.

According to an embodiment of the present invention, a crane arm assembly mounted sensor system may comprise a node within a distributed network of radiation sensor positions. An example of such a system is described in U.S. Patent Application No. 60/759,373, Filed on Jan. 17, 2006, and entitled "Distributed Sensor Network With Common Platform For CBRNE Devices", the entire teachings of which being incorporated by reference.

According to an embodiment of the present invention, a crane arm (spreader bar) mounted radiation sensor system, as described in patent application Ser. No. 11/363,594 filed on Feb. 27, 2006 is used for the detection and first stage of isotope identification for detected radiological material within a shipping container.

A sensor concentrator unit may be used to connect multiple sensors in a group and enable efficient connection to the central processor for spectral analysis. This configuration could utilize a sensor interface unit (SIU) that is comprised of an integrated multi-channel analyzer, high voltage power supply, voltage system and communications interface. This SIU configuration uses a concentrator unit to combine multiple sensors into a concentrated communications channel for connection to the central processor. The communications concentrator provides individual IP addressed for each sensor group. An example of the concentrator unit is a device that provides multiple USB ports for sensor connection and concentrates the USB ports into an Ethernet connection for backhaul.

An embedded processor unit may be used to connect multiple sensors in a group and enable efficient connection to the central processor for spectral analysis. This configuration could utilize a sensor interface unit (SIU) that is comprised of an integrated multi-channel analyzer, high voltage power supply, voltage system and communications interface. This SIU configuration is connected to an embedded processor supporting multiple sensors and providing one or more communications channel(s) for connection to the central processor. The embedded processor provides individual IP addressed for each sensor.

According to another embodiment of the present invention, the time that the spreader bar is connected to the shipping container may be extended to enable further analysis and radiological data acquisition.

According to another embodiment of the present invention, the time that the spreader bar is connected to the shipping container may be extended to enable further analysis and radiological data acquisition.

According to another embodiment of the present invention, a secondary radiation verification system could be deployed as another node of the radiation verification system to enable further analysis and radiological data acquisition.

According to another embodiment of the present invention, the targeted shipping container may be tracked and or monitored as it moves to the secondary radiation verification system.

Described now is an example of a multi-stage radiation detection and identification system with one node mounted on a spreader bar of a crane assembly and another node deployed as a secondary radiation verification position. An example of a process for operation of the system is also discussed.

A radiation detection and identification system deployed on a crane arm (or spreader bar) 102, such as illustrated in FIG. 1, provides the first and second stages of a multi-stage radiation verification system. FIG. 1 illustrates example installation positions for various sensor housings 101, 110. Certain inventive features and advantages of exemplary embodiments of a radiation detection and identification system, such as deployed in connection with a crane assembly or other shipping container handling operation, will be discussed below. However, it is assumed that the reader has an understanding of radiation and sensor technologies.

Figure 2:
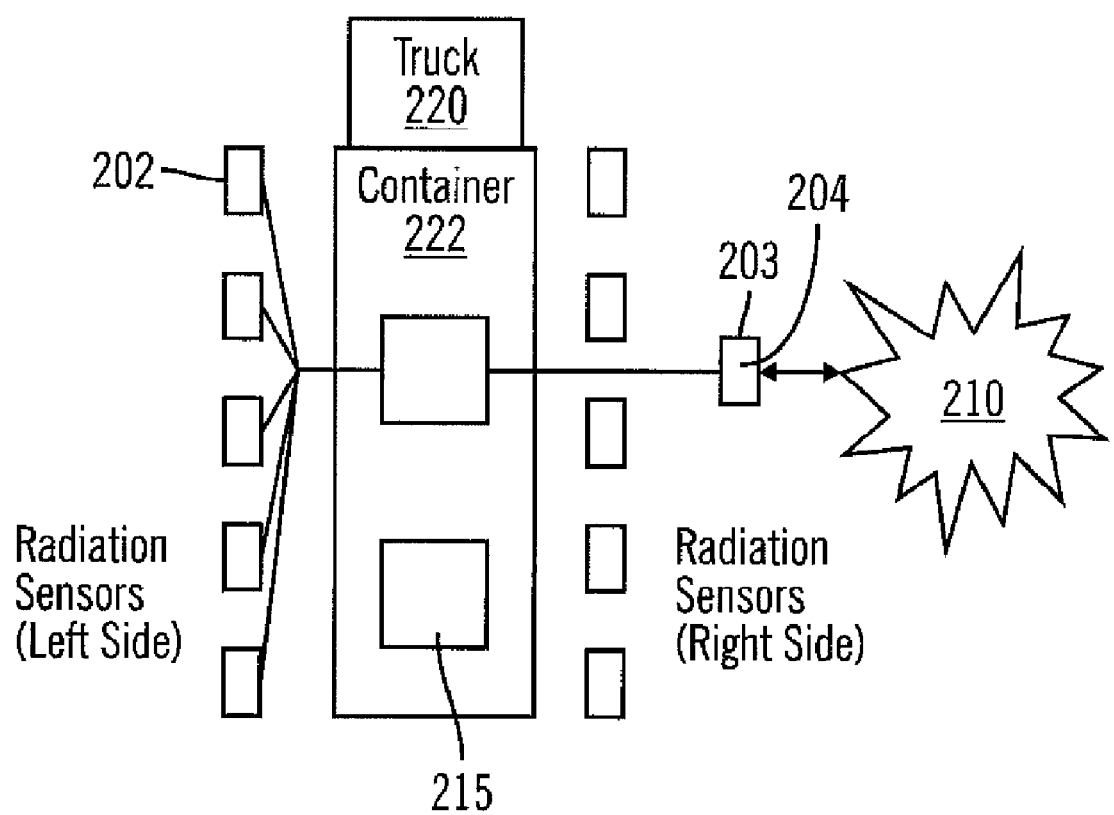
FIG. 2 is a simplified diagram of a secondary radiation verification position.

Referring to FIGS. 1 and 2, an example of a multi-node radiation verification system is shown. The system includes a spreader bar node (as shown in FIG. 1) and a secondary radiation verification node 202 as shown in FIG. 2. A truck 220 carries a container 222 that contains cargo 215 inside the container 222. Multiple radiation sensors 202 are deployed on either or both sides of the container 222 to enable further analysis of the contents 215. A power distribution station 203 provides power to the sensors. A communication distribution module 204 couples signals between the multiple radiation sensors 202 and a distribution network 210 of which is further described in FIG. 3. Once a container cargo 215 is identified at the spreader bar stage as suspect, the container 222 is tracked and moved from the spreader bar position (as shown in FIG. 1) to the secondary verification position (as shown in FIG. 2) for further analysis. In this example, the secondary verification position includes positioning the container 222 by using a truck to move the container 222 to the multiple radiation sensors 202 deployed on either or both sides of the container 222.

Figure 3:
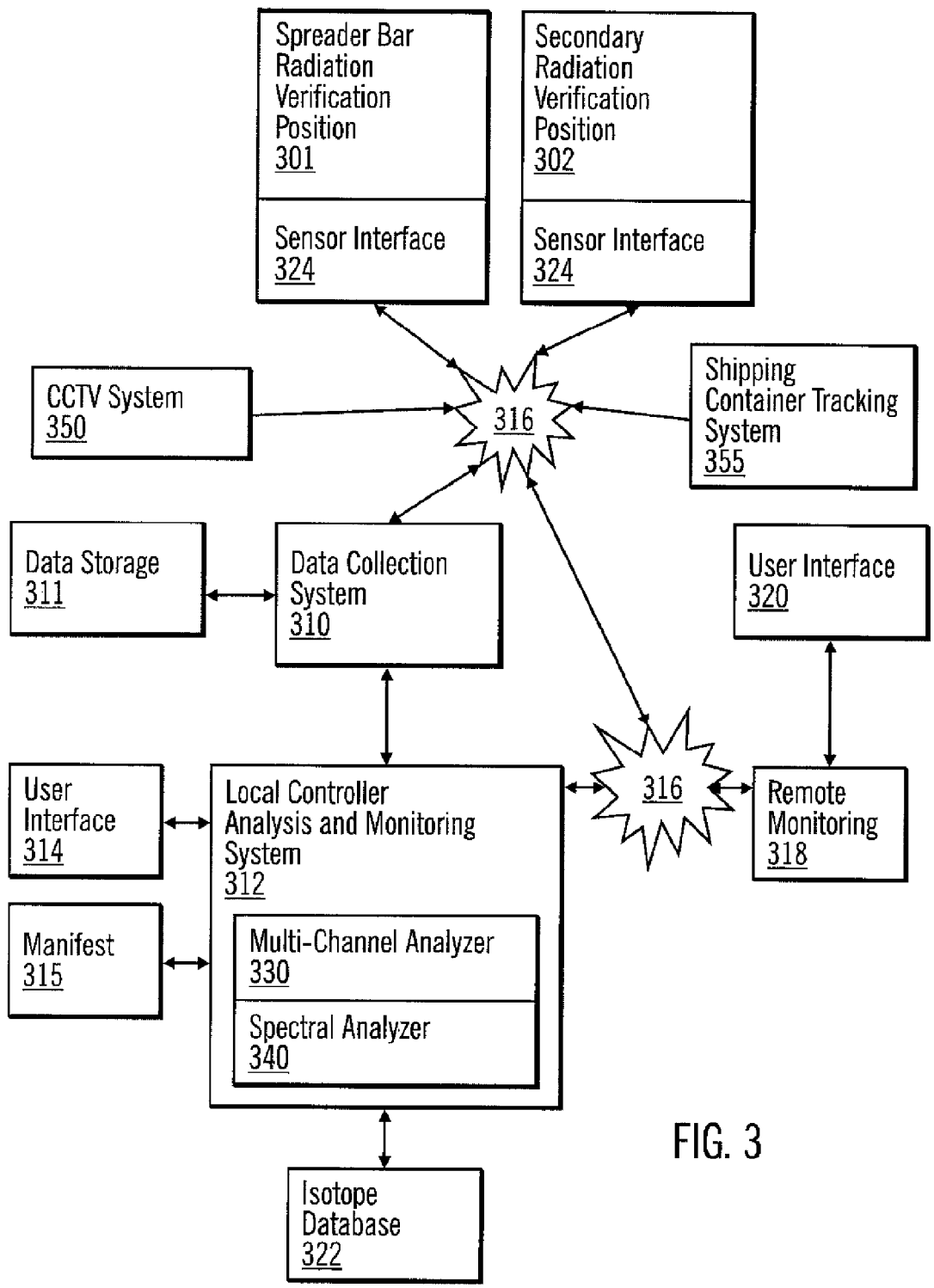
FIG. 3 is a block diagram illustrating an example of a data collection and analysis system, in accordance with an embodiment of the present invention.

With reference to FIG. 3, a data collection system 310, in this example, is communicatively coupled via cabling, wireless communication link, and/or other communication link 306 with each of the gamma radiation sensor devices 301 and neutron sensor devices 302 in each sensor unit, and with each of the neutron pulse sensor device(s) 303. The data collection system 310 includes an information processing system with data communication interfaces 324 that collect signals from the radiation sensor units 301, 302, and from the neutron pulse device(s) 303. The collected signals, in this example, represent detailed spectral data from each sensor device that has detected radiation.

The data collection system 310 is modular in design and can be used specifically for radiation detection and identification, or for data collection for explosives and special materials detection and identification.

The data collection system 310 is communicatively coupled with a local controller and monitor system 312. The local system 312 comprises an information processing system that includes a computer, memory, storage, and a user interface 314 such a display on a monitor and a keyboard, or other user input/output device. In this example, the local system 312 also includes a multi-channel analyzer 330 and a spectral analyzer 340.

The multi-channel analyzer (MCA) 330 comprises a device composed of many single channel analyzers (SCA). The single channel analyzer interrogates analog signals received from the individual radiation detectors 301, 302, and determines whether the specific energy range of the received signal is equal to the range identified by the single channel. If the energy received is within the SCA the SCA counter is updated. Over time, the SCA counts are accumulated. At a specific time interval, a multi-channel analyzer 330 includes a number of SCA counts, which result in the creation of a histogram. The histogram represents the spectral image of the radiation that is present. The MCA 330, according to one example, uses analog to digital converters combined with computer memory that is equivalent to thousands of SCAs and counters and is dramatically more powerful and cheaper.

The histogram is used by the spectral analysis system 340 to identify isotopes that are present in materials contained in the container under examination. One of the functions performed by the information processing system 312 is spectral analysis, performed by the spectral analyzer 340, to identify the one or more isotopes, explosives or special materials contained in a container under examination. With respect to radiation detection, the spectral analyzer 340 compares one or more spectral images of the radiation present to known isotopes that are represented by one or more spectral images 350 stored in the isotope database 322. By capturing multiple variations of spectral data for each isotope there are numerous images that can be compared to one or more spectral images of the radiation present. The isotope database 322 holds the one or more spectral images 350 of each isotope to be identified. These multiple spectral images represent various levels of acquisition of spectral radiation data so isotopes can be compared and identified using various amounts of spectral data available from the one or more sensors. Whether there are small amounts (or large amounts) of data acquired from the sensor, the spectral analysis system 340 compares the acquired radiation data from the sensor to one or more spectral images for each isotope to be identified. This significantly enhances the reliability and efficiency of matching acquired spectral image data from the sensor to spectral image data of each possible isotope to be identified. Once the one or more possible isotopes are determined present in the radiation detected by the sensor(s), the information processing system 312 can compare the isotope mix against possible materials, goods, and/or products, that may be present in the container under examination. Additionally, a manifest database 315 includes a detailed description of the contents of each container that is to be examined. The manifest 315 can be referred to by the information processing system 312 to determine whether the possible materials, goods, and/or products, contained in the container match the expected authorized materials, goods, and/or products, described in the manifest for the particular container under examination. This matching process, according to an embodiment of the present invention, is significantly more efficient and reliable than any container contents monitoring process in the past.

The spectral analysis system 340, according to an embodiment, includes an information processing system and software that analyzes the data collected and identifies the isotopes that are present. The spectral analysis software consists of more that one method to provide multi-confirmation of the isotopes identified. Should more than one isotope be present, the system identifies the ratio of each isotope present. Examples of methods that can be used for spectral analysis such as in the spectral analysis software according to an embodiment of a container contents verification system, include: 1) a margin setting method as described in U.S. Pat. No. 6,847,731; and 2) a LINSCAN method (a linear analysis of spectra method) as described in U.S. Provisional Patent Application No. 60/759,331, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

With respect to analysis of collected data pertaining to explosives and/or special materials, the spectral analyzer 340 and the information processing system 312 compare identified possible explosives and/or special materials to the manifest 315 by converting the stored manifest data relating to the shipping container under examination to expected explosives and/or radiological materials and then by comparing the identified possible explosives and/or special materials with the expected explosives and/or radiological materials. If the system determines that there is no match to the manifest for the container then the identified possible explosives and/or special materials are unauthorized. The system can then provide information to system supervisory personnel to alert them to the alarm condition and to take appropriate action.

Removal of Background Radiation Effects

Dynamic Background

The background radiation at a seaport and more specifically the changing background associated with a moving container across land, sea, vessels and at different heights, poses a specific challenge to radiation detection and isotope identification. According to one embodiment of the present invention, this issue is addressed through the use of a dynamic background method used to compensate for the changing background effects. This method applies continuous background updates against the main background data. Different weights and intervals can be varied for the background updates to achieve the appropriate dynamic background for the specific application. An example formula is provided below, and also shown in FIG. 9.

$$Bi(X) = Ai(X) * \text{alpha} + Bi-1(X) * (1 - \text{alpha}) \qquad (1)$$

Figure 7:
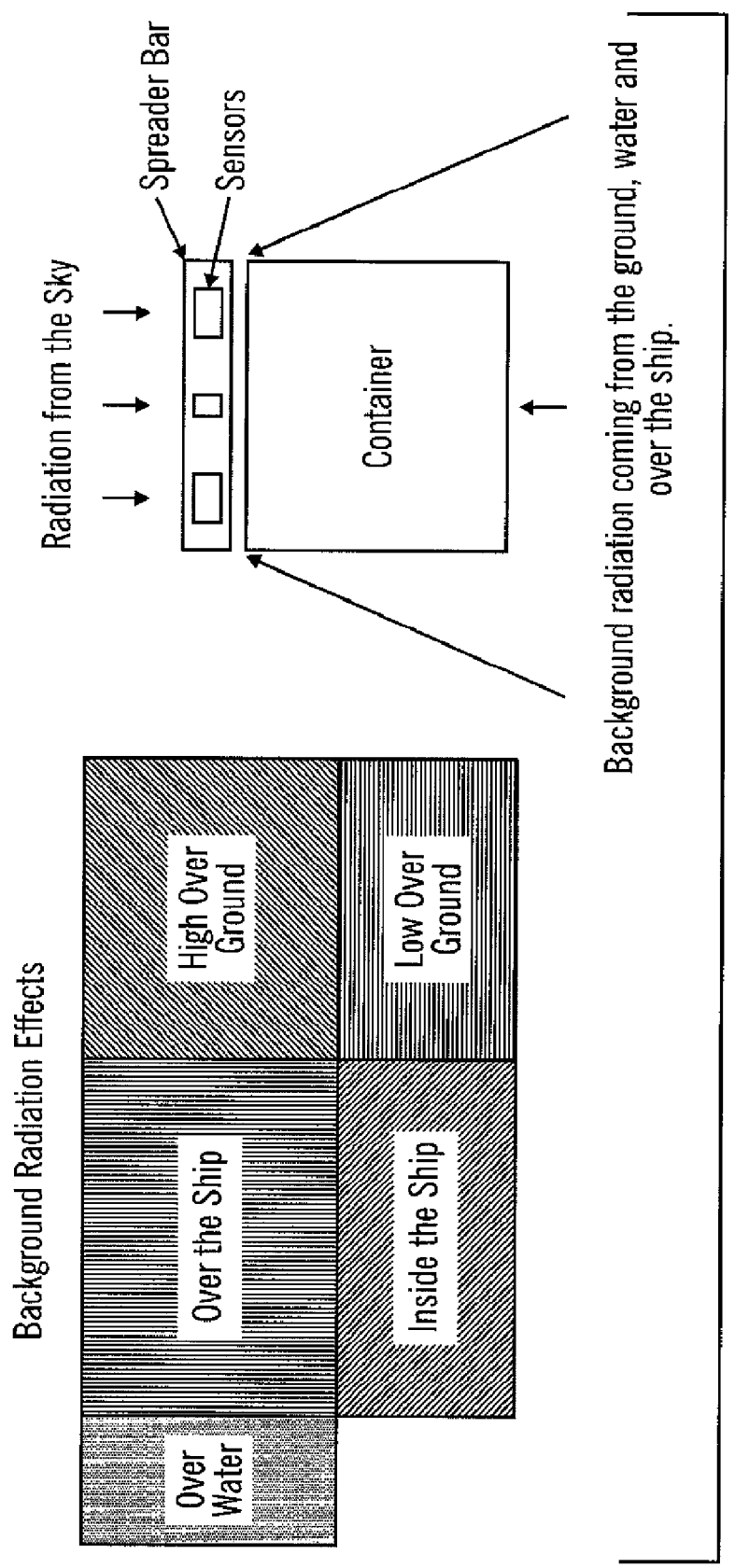
FIG. 7 is a diagram illustrating multiple background radiation environment effects.

$Bi(X)$ = New Dynamic Background $\underset{\text{Snap Shot of Background}}{Ai(X)} * \underset{\text{Learning Background}}{\text{alpha}} + \underset{\text{Previous Background}}{Bi-1(X)} * \underset{\text{Differential}}{(1 - \text{alpha})}$ As shown in FIG. 7, background radiation effects can vary depending on a varying background environment that can be experienced by the sensors, such as the sensors located at the spreader bar and/or sensors located at locations relative to changing background environments. The diagram in FIG. 7 illustrates the variety of background radiation environments that the spreader bar will move through—in normal operation. For example, the sensors at the spreader bar can be over water, over a ship, high over the ground, low over the ground, or inside the ship. These different background environments can affect the radiation detection and isotope identification. Radiation from the sky should typically be predominant and remain normal during spreader bar movement. Also, sensors at the spreader bar should typically be protected by the container under examination and the spreader bar from most of the background radiation coming from the ground, water, and over the ship. Accordingly, a new and novel approach to compensate for the changing background effects applies continuous background updates against the main background data.

Figure 8:
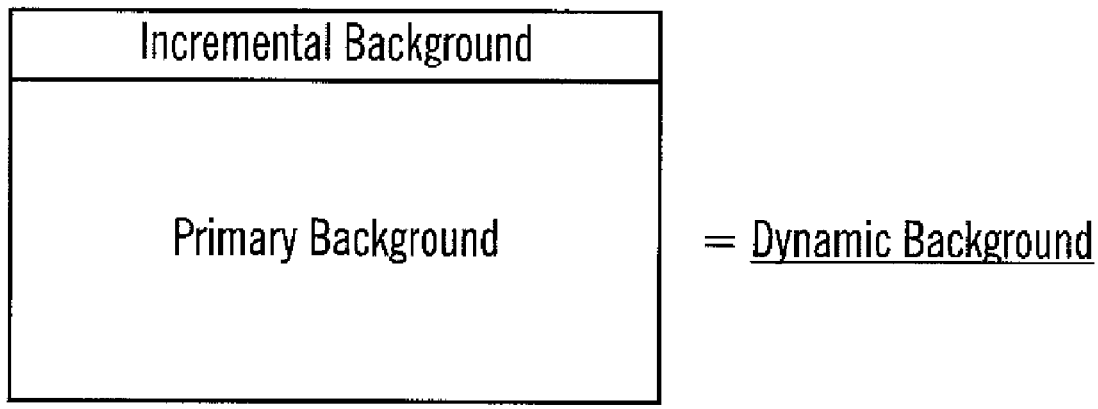
FIG. 8 is a diagram illustrating dynamic background radiation effects compensation.

As shown in FIG. 8, the dynamic background is comprised of the primary background and the incremental background. As radiation data is collected and processed for analysis, according to one embodiment of the present invention, the background environment effects can be subtracted from the collected data using continuous background updates against a main background data. This dynamic background compensation approach has the advantages of increased speed and sensitivity for dynamic background capture, memory efficiency in processing collected data, and flexibility to adjust to variable system parameters and to address specific applications and applications learning rate differential. Further, an information processing system can learn a particular process used in locating sensors during data collection, such as to anticipate the changes in background effects in a normal operation and movement of the spreader bar. Additionally, the dynamic background compensation approach can provide a continuous differential subtraction of the effects of varying background environment. This approach enhances the quality of the analyzed data leading to better and more reliable radiation detection and isotope identification.

According to an alternative embodiment of the present invention, a multiple background analysis approach can be used to remove varying background effects on the collected data. In one example, a GPS detector is mechanically coupled to the structure supporting the moving sensors, such as the crane spreader bar, and provides continuous location data (of the spreader bar) to an information processing system that is processing the collected data. The location of the spreader bar, for example, can indicate the type of background environment that is being experienced by the sensors at the spreader bar. The GPS detector operates in a well known manner and can provide both geographic location information and elevation information. Knowing the elevation of the spreader bar above, say, ground or sea level, can indicate the type of background effects that are experienced by the sensors at the spreader bar. The elevation information, and/or the geographic location information, can be, for example, compared against an expected map of structures and background environments in proximity to the spreader bar. These expected background environments correspond to background effects that can, for example, be subtracted from the collected data to provide better and more reliable data for analysis leading to better and more reliable radiation detection and isotope identification. Alternative location detection devices, including mechanical devices and/or electrical devices and/or manual data entry, can be used by the system to track changing backgrounds and corresponding background effects on collected data.

Another use of the elevation information and the geographic location information by an information processing system is for controlling the triggers and effects of devices used to collect the radiation data. For example, a neutron pulse may be generated by a neutron pulse device that is included in the sensor system deployed at the spreader bar or on the gantry crane to provide an active analysis whereby gamma feedback following the neutron pulse can identify shielded radiological materials such as highly enriched uranium, explosives or illicit drugs, inside containers. However, a particular system implementation may limit the activation of the neutron pulse device to particular geographic areas and/or elevations above ground and/or sea level. For example, a neutron pulse device can be controlled to remain inactive while the crane and/or spreader bar are in close proximity to a crane operator's cabin or to a protected area such as one normally occupied by people. The flexibility and dynamic adjustment to different operational environments while enhancing the speed and reliability of data analysis, as discussed above, is a significant advantage of the present inventive system that was not available in the past.

The user interface 314 allows service or supervisory personnel to operate the local system 312 and to monitor the status of radiation detection and identification of isotopes and/or the detection of RF signals by the collection of sensor units 301, 302 and 303 deployed on the frame structure, such as on the crane arm assembly (or spreader bar).

The user interface 314, for example, can present to a user a representation of the collected received returning signals, or the identified possible explosives and/or special materials in the shipping container under examination, or any system identified unauthorized explosives and/or special materials contained within the shipping container under examination, or any combination thereof.

The data collection system can also be communicatively coupled with a remote control and monitoring system 318 such as via a network 316. The remote system 318 comprises an information processing system that has a computer, memory, storage, and a user interface 320 such as a display on a monitor and a keyboard, or other user input/output device. The network 316 comprises any number of local area networks and/or wide area networks. It can include wired and/or wireless communication networks. This network communication technology is well known in the art. The user interface 320 allows remotely located service or supervisory personnel to operate the local system 312 and to monitor the status of shipping container verification by the collection of sensor units 301, 302 and 303 deployed on the frame structure, such as on the crane arm assembly (or spreader bar). The central monitoring system can display the position of the shipping container as it is moved to the secondary position through the use of CCTV cameras (350) or shipping container tracking systems (355).

A neutron pulse device can be included in the sensor system deployed on the spreader bar or on the gantry crane to provide an active analysis whereby gamma feedback identifies shielded radiological materials such as highly enriched uranium, explosives or illicit drugs.

Figure 4:
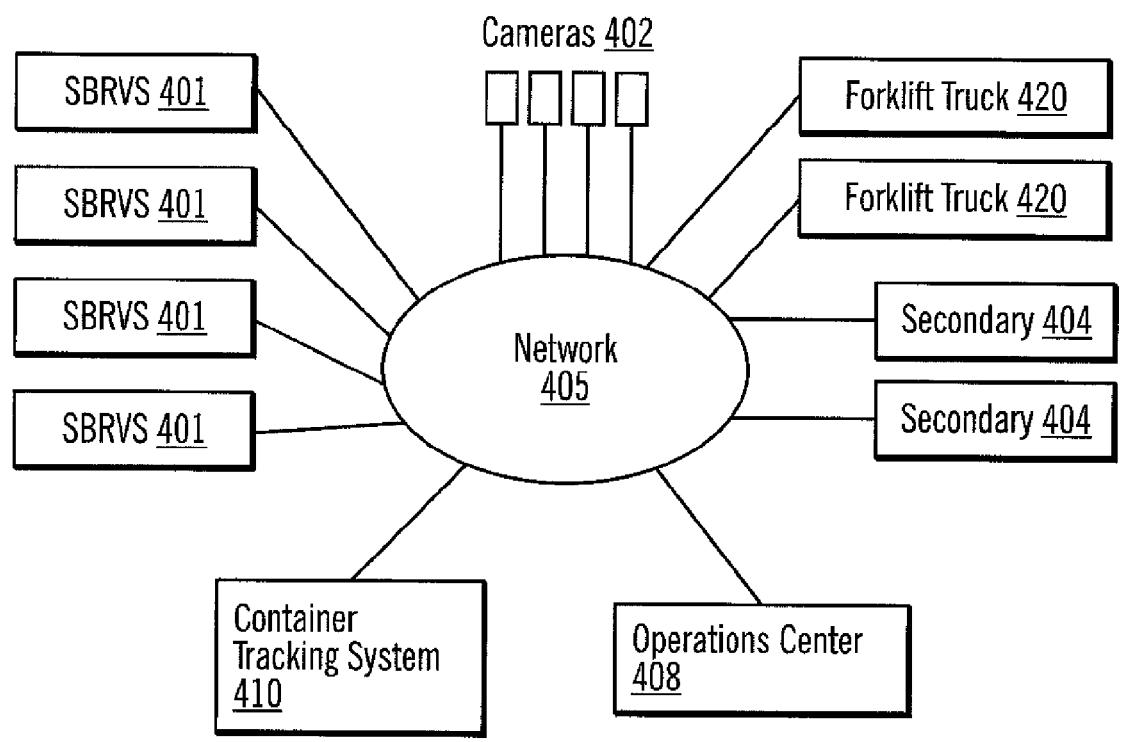
FIG. 4 is a block diagram illustrating an example of a central monitoring system, in accordance with an embodiment of the present invention.

Referring to FIG. 4, an example of a multi-node radiation verification system includes multiple spreader bar radiation verification systems (401) and secondary radiation verification nodes (404), operations center (408), container tracking system (410) and CCTV (402) cameras that are interconnected by a data network (405). In some cases a forklift truck is used to move the containers around the terminal. The forklift truck (420) is equipped with a spreader bar and can be configured as a wireless radiation verification node.

Figure 5:
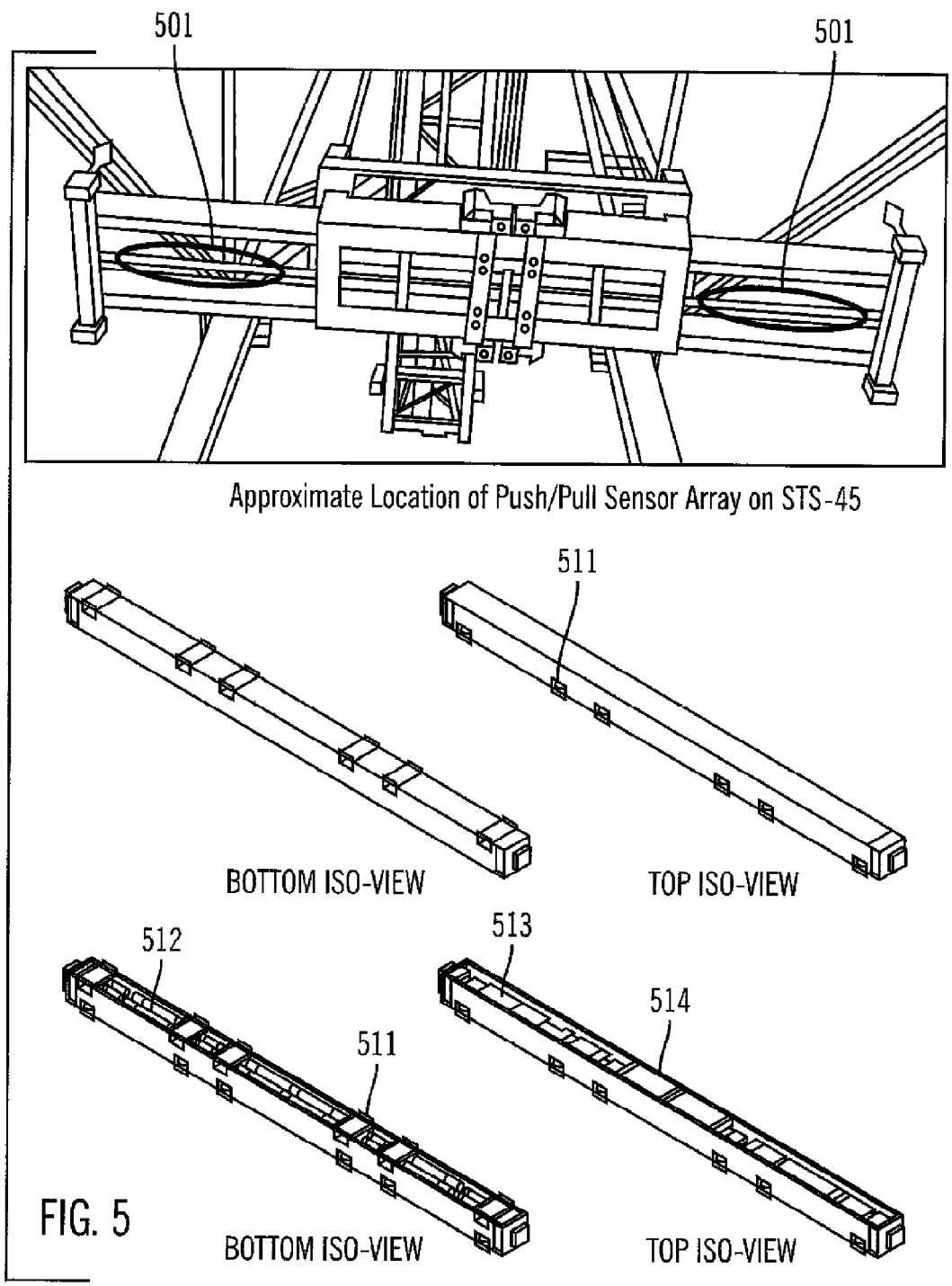
FIG. 5 is a diagram illustrating radiation sensors deployed in a push pull bar configuration of a crane spreader bar, according to an embodiment of the present invention.

Referring to FIG. 5, an example of a spreader bar with radiation sensors installed in the push pull bars is shown. In FIG. 5, one or more radiation sensors are integrated within the push pull bar 501. The radiation sensors are enclosed in a box with shock absorbing connectors 511. The gamma sensors 512 are shock mounted within the box on the lower side of the unit. The one or more gamma sensors comprise sensor resolution of 7% or better at 662 kev. The neutron sensors 514 and the supporting electronics 513 are mounted on the top side of the box. As an example, unit dimensions can have a length of 128.35 inches, a width of 7.0 inches, and a height of 7.99 inches. Alternative mounting arrangements of the one or more radiation sensors, the gamma sensors 512, the neutron sensors 514, and the supporting electronics 513, relative to the push pull bar 501 should become obvious to those of ordinary skill in the art in view of the present discussion.

Figure 6:
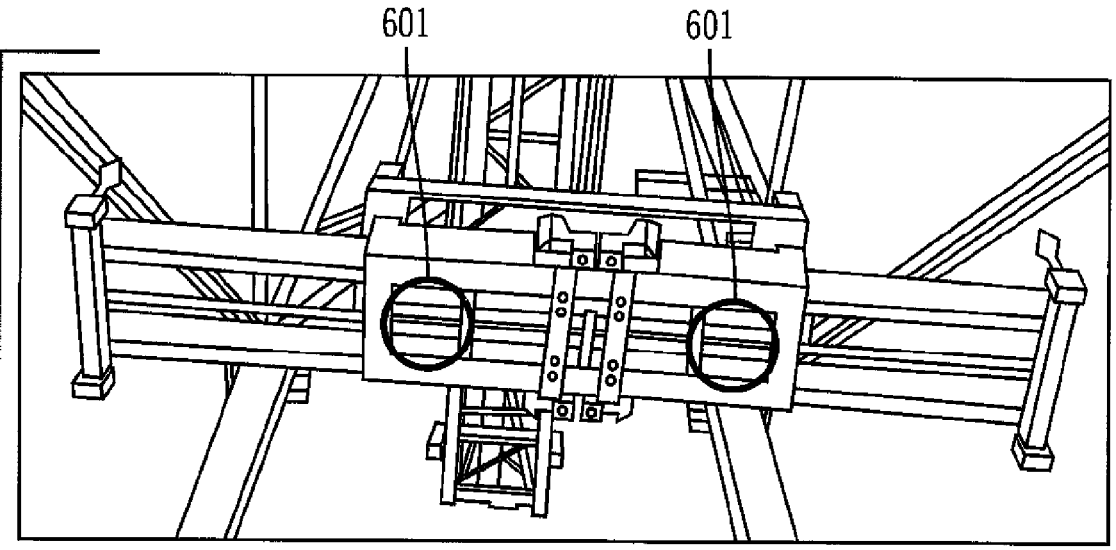
FIG. 6 is a diagram illustrating radiation sensors deployed about the main body of a crane spreader bar, according to an embodiment of the present invention.
Figure 6:
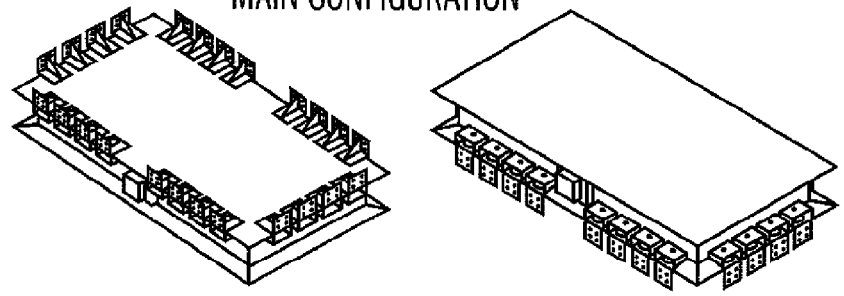
Figure 6:
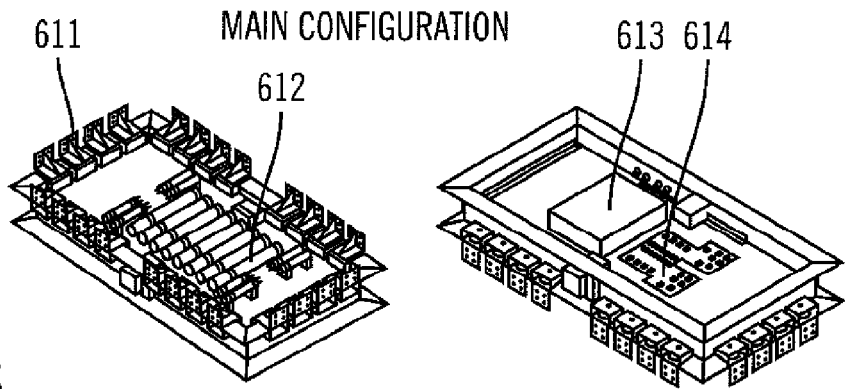

Referring to FIG. 6, an example of a spreader bar with radiation sensors installed in the main unit 601 is shown. In the example of FIG. 6, the radiation sensors are integrated within the main unit 601. The radiation sensors are enclosed in a box with shock absorbing connectors 611. The gamma sensors 612 are shock mounted within the box on the lower side of the unit. The neutron sensors 613 and the supporting electronics 614 are mounted on the top side of the box. As an example, unit dimensions can have a length of 56.60 inches, a width of 29.6 inches, and a height of 10.18 inches. Alternative mounting arrangements of the one or more radiation sensors, the gamma sensors 612, the neutron sensors 613, and the supporting electronics 614, relative to the main unit 601 should become obvious to those of ordinary skill in the art in view of the present discussion.

By operating the system remotely, such as from a central monitoring location, a larger number of sites can be safely monitored by a limited number of supervisory personnel. Besides monitoring container handling operations such as from crane arm assemblies, as illustrated in the example of FIG. 1, it should be clear that many different applications can be deployed for the initial detection and identification stages for container analysis. For example, fork lift truck mounted sensor units communicating with a remote monitoring system allow radiation detection and identification where large amounts of cargo are moved and handled, such as at ports, railway, and intermodal stations, and at ships, airplanes, trucks, warehouses, and other carrier environments, and at such other places that have large amounts of cargo to handle as should be understood by those of ordinary skill in the art in view of the present discussion.

Additionally, the system monitoring function can be combined to monitor more than radiation and explosives. Other types of hazardous elements can be monitored in combination with the radiation detection by combining appropriate sensors and detectors for these other types of hazardous elements with the radiation sensor units and monitoring system according to alternative embodiments of the present invention.

The preferred embodiments of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

An embodiment according to present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention.

The scope of the invention is not to be restricted, therefore, to the specific embodiments, and it is intended that the appended claims cover any and all such applications, modifications, and embodiments within the scope of the present invention.

What is claimed is:

1. A multi-stage radiation detection and identification system, comprising:
    a radiation sensor system deployed on a gantry crane and comprising:
        one or more gamma sensors; and/or
        one or more solid-state neutron sensors, wherein the one or more gamma sensors and/or the one or more solid-state neutron sensors being collectively mounted on a frame structure mechanically coupled to the gantry crane, referred to as a primary radiation sensor position, and that is locatable in proximity to a shipping container under examination;
    a secondary radiation sensor position, that is located separate from the radiation sensor system deployed on the gantry crane, and comprising one or more gamma sensors and/or one or more neutron sensors for further analyzing gamma and/or neutron radiation that has been detected in the shipping container by the primary radiation sensor position;
    a distributed network communicatively coupling the gantry crane radiation sensor system and the one or more sensors of the secondary radiation sensor position as individually addressable nodes on a radiation sensor network;
    a first digital data collection system, communicatively coupled with radiation sensor system deployed on the gantry crane that collects radiation data from the radiation sensor system on the gantry crane;
    a second digital data collection system, communicatively coupled with the one or more sensors at the secondary radiation position that collects radiation data from the one or more gamma sensors and/or one or more neutron sensors at the secondary radiation position;
    a multi-channel analyzer system, communicatively coupled with the first and second digital data collection systems, that prepares a set of histograms of the collected radiation data from the first and second digital data collection systems, respectively, the set of histograms comprising the radiation data collected from the secondary radiation position combined with the radiation data collected from the first radiation position, and wherein the set of histograms represent a set of spectral images of radiation present in the shipping container under examination;
    a spectral analysis system, communicatively coupled with the multi-channel analyzer system and the first and second digital data collection systems, that receives and analyzes the collected radiation data from the first and second digital data collection systems, respectively, and the histograms to detect radiation and to identify one or more isotopes associated with the collected detected radiation data;
    a first data storage unit that stores data representing isotope spectra for use by the spectral analysis system, where one or more spectral images stored in the first data storage unit represents at least one known isotope, wherein the spectral analysis system compares the set of spectral images to the one or more spectral images stored in the first data storage unit to identify the one or more isotopes associated with the collected detected radiation, the first data storage means being communicatively coupled with the spectral analysis system;
    an information processing system, communicatively coupled with the spectral analysis system, that analyzes the identified one or more isotopes and to determine a set of potential materials or goods that the identified one or more isotopes represent; and
    a second data storage unit that stores data representing a manifest relating to the shipping container under examination, the second data storage unit being communicatively coupled with the information processing system, the information processing system further compares the determined set of potential materials or goods with the manifest relating to the shipping container under examination to determine any unauthorized materials or goods contained within the shipping container under examination.

2. The system of claim 1, further comprising a first stage of radiation analysis that comprises detecting radiological material within the shipping container by a set of sensors deployed on a spreader bar of the gantry crane.

3. The system of claim 1, further comprising a first stage of radiation analysis that comprises detecting radiological material within the shipping container from a set of sensors deployed on a radiation portal.

4. The system of claim 1, further comprising a second stage of radiation analysis that comprises identifying radiological material within the shipping container based on radiation data obtained from a set of sensors deployed on a spreader bar of the gantry crane.

5. The system of claim 1, further comprising a second stage of radiation analysis that comprises maintaining sensors deployed on a spreader bar of the gantry crane in close proximity with the shipping container for an extended period of time where additional data is collected from the sensors to further identify radiological material within the shipping container under examination.

6. The system of claim 1, further comprising a second stage of radiation analysis that comprises placing the shipping container at the secondary radiation sensor position for further analysis.

7. The system of claim 1, further comprising a second stage of radiation analysis that is performed on the shipping container under examination by a set of sensors deployed on a fork lift truck.

8. The system of claim 1, wherein at least one of the one or more gamma sensors and the one or more solid state neutron sensors comprise an integrated analog interface and analog to digital converter.

9. The system of claim 1, wherein the one or more gamma sensors comprise a sensor resolution of 7% or better at 662 kev.

10. The system of claim 1, further comprising an information processing system that is communicatively coupled with at least one of the first digital data collection system and the second digital collection system and that adjusts collected radiation data from at least one of the first digital data collection system and the second digital collection system to compensate for background radiation effects from the background environment.

11. The system of claim 10, wherein the information processing system dynamically adjusts the collected radiation data according to varying background radiation effects.

12. The system of claim 10, wherein the information processing system adjusts the collected radiation data according to multiple background radiation effects analysis.

13. A method of performing multi-stage radiation detection, the method comprising:

locating a frame structure mechanically coupled to a gantry crane in proximity to a shipping container at a first radiation sensor position, wherein the frame structure comprises a radiation sensor system including one or more gamma sensors and one or more solid-state neutron sensors;

collecting first radiation data from the radiation sensor system on the gantry crane at the first radiation sensor position during a first interval of time;

determining, based on the first radiation data collected at the first radiation sensor position, that the shipping container comprises radiological materials therein;

locating, in response to determining that the shipping container comprises radiological materials therein, the shipping container at a secondary radiation sensor position, wherein the secondary radiation sensor position comprises one or more sensors that analyze radiological materials, wherein the one or more sensors are separate from the radiation sensor system of the frame structure;

collecting, in response to locating the shipping container at the secondary radiation sensor position, second radiation data, during a second interval of time, associated with the radiological materials within the shipping container from the one or more sensors at the secondary radiation position;

generating a set of histograms based on the first radiation data and the second radiation data, wherein the set of histograms represent a set of spectral images of radiation present in the shipping container;

comparing the set of spectral images to one or more spectral images representing at least one known isotope;

identifying, based on the comparing, at least one isotope present within the shipping container;

analyzing the at least one isotope that has been identified;

determining, based on the analyzing, a set of potential materials or goods within the shipping container that the at least one isotope that has been identified represents; and comparing the set of potential materials or goods with a manifest associated with the shipping container; and determining, based on comparing the set of potential materials or goods with the manifest, that the shipping container comprises at least one of unauthorized and authorized materials or goods contained.

14. The method of claim 13, wherein the set of histograms are generated from a combination of the first radiation data and the second radiation data, the second radiation data at the secondary radiation sensor position being collected as a continuation of the first radiation data at the first radiation sensor position.

15. The system of claim 10, further comprising:

a dynamic background radiation subtraction processing system, communicatively coupled with the first digital data collection system and the second digital data collection system, for dynamically removing varying background radiation effects from the radiation data collected by the first digital data collection system and the radiation data collected by the second digital data collection system, the varying background radiation effects being dynamically updated based on the varying location of the container under examination; and wherein the spectral analysis system is communicatively coupled with the dynamic background radiation subtraction processing system, for spectrally analyzing the collected radiation data from the first and second digital data collection systems, respectively, and the histograms, with the varying background radiation effects removed, to identify one or more isotopes associated with the collected radiation data and the histograms.

* * * * *